United States Patent
Wang et al.

(10) Patent No.: US 6,748,435 B1
(45) Date of Patent: Jun. 8, 2004

(54) RANDOM EARLY DEMOTION AND PROMOTION MARKER

(75) Inventors: Fugui Wang, East Lansing, MI (US); Sarit Mukherjee, Mt. Laurel, NJ (US); Dennis Bushmitch, Somerset, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/560,323

(22) Filed: Apr. 28, 2000

(51) Int. Cl.⁷ .................. G06F 15/173; G06F 15/16; G06F 11/00
(52) U.S. Cl. .................. 709/225; 709/229; 709/240; 370/235.1; 370/230; 370/232
(58) Field of Search .................. 709/240, 223–226, 709/229, 230; 370/229–240

(56) References Cited

U.S. PATENT DOCUMENTS 5,005,167 A  *  4/1991  Arthurs et al. .............. 359/135
5,311,513 A  *  5/1994  Ahmadi et al. ............. 370/230
6,192,032 B1 *  2/2001  Izquierdo .................... 370/230

* cited by examiner

*Primary Examiner*—David Wiley
*Assistant Examiner*—Joseph Avellino
(74) *Attorney, Agent, or Firm*—Harness, Dickey & Pierce, PLC

(57) ABSTRACT

Data packets are received by the REDP traffic conditioning marker from the upstream domain and each have a red, yellow, or green priority level. The traffic conditioning marker monitors the rate of green data packets flowing through the A random early demotion and promotion (REDP) traffic conditioning marker is located between an upstream domain and a downstream domain. If the rate exceeds a negotiated rate, the traffic conditioner randomly and fairly demotes green packets to yellow. If the rate is less than the negotiated rate, the traffic conditioner randomly and fairly promotes yellow packets to green. The traffic conditioner removes the phase effects that occur in conventional markers.

24 Claims, 8 Drawing Sheets

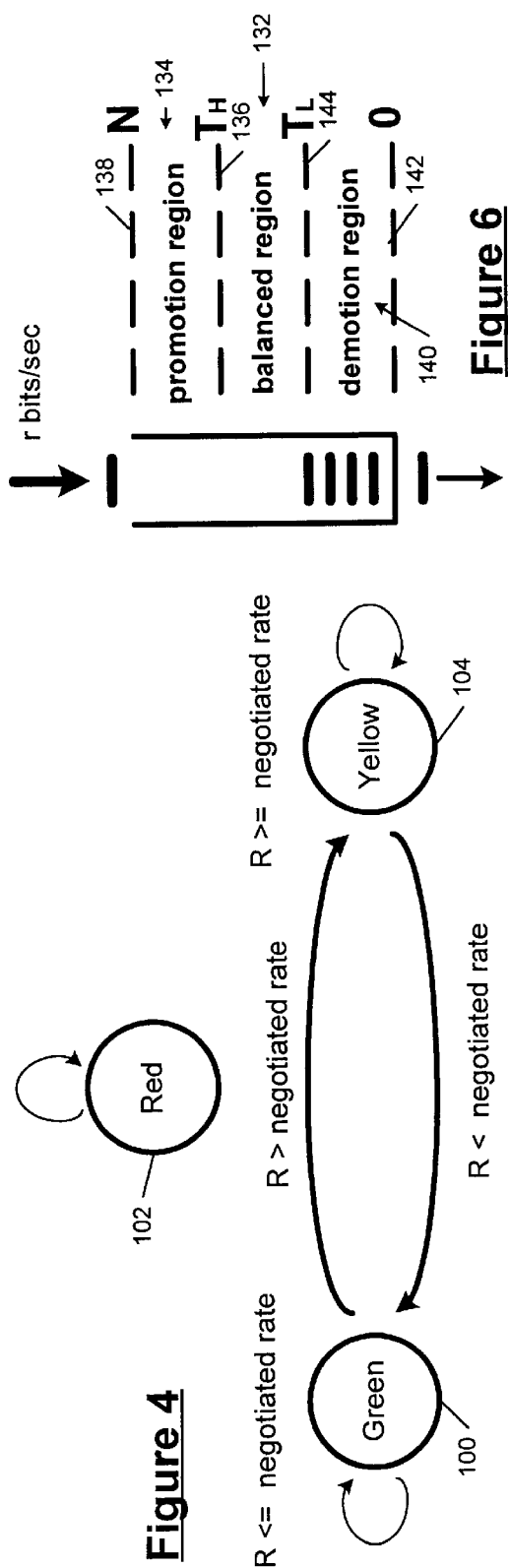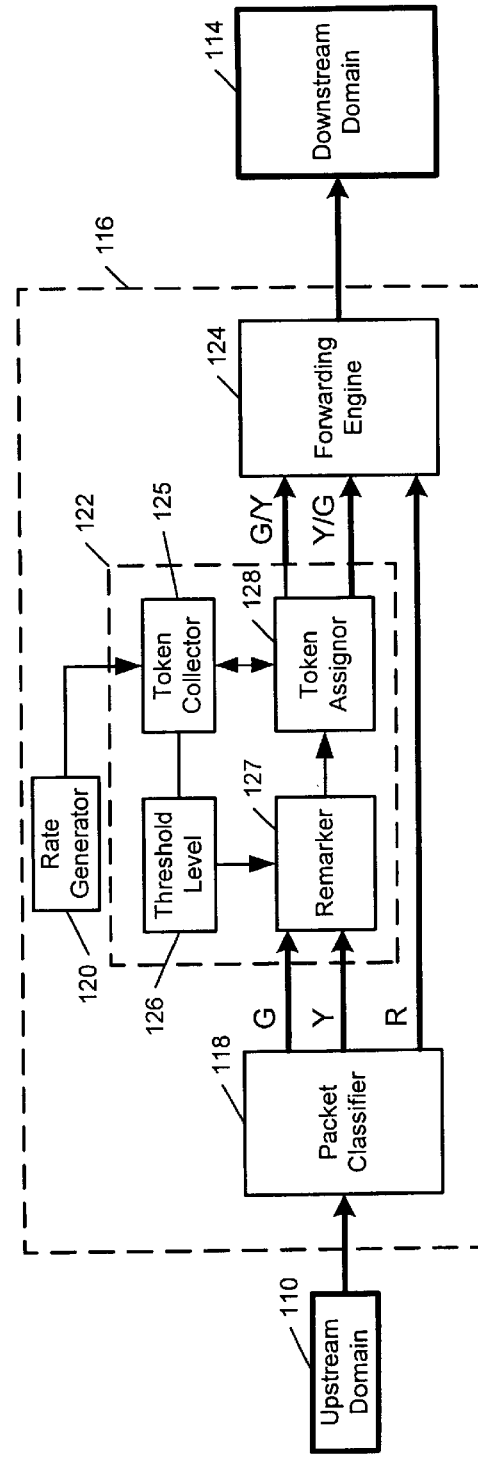
Figure 4
Figure 6
Figure 5

RANDOM EARLY DEMOTION AND PROMOTION MARKER

BACKGROUND AND SUMMARY OF THE INVENTION

The present invention relates generally to network systems. More particularly, the invention relates to a traffic conditioning marker associated with a router.

With the explosive growth of the internet, there is a growing interest in using the internet and other internet protocol-based networks to deliver high bandwidth selections such as multi-media video and audio material. The internet is a connectionless network offering best effort delivery service. Packets of data are routed to an address of an intended recipient whose address is contained in the packet. A specific connection between the sender and the intended recipient is not required because all host nodes on the network include the inherent capability to route packets from node to node until delivery occurs.

The packet delivery scheme is constructed as a best effort delivery system in which the delivery of packets is not guaranteed. Packets may be sent via different routes in an effort to increase the likelihood of delivery. Thus, if one node on the network is experiencing congestion, subsequent packets may be alternatively routed to avoid the congested node. This means that packets do not inherently have a guaranteed arrival time. In other words, packets corresponding to a single message may be received out of order.

Multi-media data often requires real-time delivery. In the case of audio or video data, the data stream representing a particular media selection needs to be delivered in the proper time sequence to allow the user to play back the audio or video selection "live" as it is being sent.

In the best effort service model, the network allocates the bandwidth among all of the contending users as best as it can. The network attempts to serve all of the users without making any commitment to data delivery rates or any other service quality. As multi-media and real-time applications proliferate, it is becoming more desirable to provide service guarantees for internet delivery. Many enterprises and users are willing to pay an additional price to get preferred service from the internet provider.

The integrated services model and the differentiated services model have been proposed to provide guaranteed service. The integrated services model is analogous to the circuit-switched service in the current telephone system. While the integrated services model provides guaranteed service, it has two major drawbacks. First, the amount of state information increases proportionately with the increased flow of data which leads to poor scalability at the core routers. Second, implementation of the integrated services model requires significant changes to the internet infrastructure and, therefore, requires significant expenditures of capital. For these reasons, the integrated services model is not an economically or logistically feasible approach at this time.

The differentiated services model provides a simple and predefined per-hop behavior (PHB) level service differentiation in the internet core routers. Per-flow or flow aggregate marking, shaping and policing are performed at the edge routers. The differentiated services model does not suffer from the scalability problems associated with the integrated services model. The differentiated services model also requires far less significant changes to the existing internet infrastructure.

Referring to FIG. 1, a prior art networking system 10 employing the differentiated services model is illustrated and includes a first domain 12 and a second domain 14. The first and second domains 12 and 14 each include multiple core routers 16, 18, 20, 22, 24 and 26 that are connected by backbone networks 30 and 32. The first domain 12 and the second domain 14 are interconnected to each other through edge routers 36 and 38. End users 40, 42, 44, 46, 48, and 50 are likewise connected through edge routers 52, 54, 56, and 58 by stub domain 60 and 62.

Before entering a differentiated services domain, such as the first domain 12, a packet is assigned a differentiated services code point (DSCP) by a traffic conditioning marker associated with edge router 52. When the packet reaches a differentiated services aware router such as the core router 18, the DSCP contained in the packet is checked to determine a forwarding priority of the packet.

The DSCP contained in the packet may be changed when it crosses a boundary of two domains. For example, in FIG. 1 a packet is sent by one of the end users 40, 42, 44 associated with host 60 to one of the end users 46, 48, or 50 associated with stub domain 62. The packet may be marked by the edge router 52 or by another marker associated with the stub domain 60 as a high priority DSCP packet when the packet enters the first domain 12.

At a boundary 64 between the first domain 12 and the second domain 14, the marker at the edge router 38 may remark the packet as a low priority DSCP packet before forwarding the packet to the second domain 14 if the first domain 12 has not negotiated enough traffic forwarding rate with the second domain 14 for the requested priority level.

Currently, a single class for expedited forwarding (EF) and four classes for assured forwarding (AF) have been defined. EF was originally proposed to be used for premium services. After EF and AF were defined, it was expected that premium services traffic would be allocated only a small percentage of network capacity and would be assigned to a high-priority queue in the routers. EF is ideal for real-time services such as internet protocol (IP) telephony, video conferences, and other real time multi-media applications.

AF is used for assured services. The Red-In/Out (RIO) approach was proposed to ensure that the expected capacity specified by a traffic profile is obtained. Upon the arrival of each packet, the packet is marked as "In" or "Out" depending upon whether the packet is within the traffic profile. When a differentiated services-aware router is employed, all of the incoming packets are queued in the original transmission order. During network congestion, however, the router drops the packets that are marked as "Out". If the network controls the aggregate "In" packets such that they do not exceed the capacity of the link, the throughput of each flow or flow aggregate can be assured to be at least the rate defined in the traffic profile.

To ensure service differentiation, Assured Forwarding Per-Hop Behavior (AFPHB) specifies four traffic classes with three drop precedence levels within each class. In all, there are 12 DSCP's for AFPHB. Within an AF class, a packet is marked as one of three colors, green, yellow or red. Green has the lowest drop probability and red has the highest drop probability.

An internet connection typically spans a path involving one or more network domains as is illustrated in FIG. 1. If a guaranteed arrival is desired, the network system 10 must ensure that the aggregate traffic along the path does not exceed any of the inter-domain negotiated traffic rates. This is very difficult since the inter-domain service agreements are not usually renegotiated at the initiation of each new connection. For AF, the inter-domain traffic rates are usually negotiated statically and/or updated periodically to avoid signaling overhead and scalability problems. The negotiation is usually based on statistical estimation. At any given time, the aggregate flow rate may be higher or lower than the negotiated rate.

Referring now to FIG. 2, a traffic conditioning marker 68 that is typically located in an edge router between an upstream domain 70 and a downstream domain 72 is illustrated and includes a packet classifier 76 which separates "In" packets from "Out" packets. A rate generator 78 defines a negotiated token rate of r bits per second. A packet remarker 80 determines whether to remark some of the "In" packets as "Out" packets depending upon a maximum burst rate b, the incoming flow rate of "In" packets, and the negotiated rate between the upstream and the downstream domain 70 and 72. A forwarding engine 82 sends the "Out" packets forwarded by the packet classifier 76 to the downstream domain 72. The forwarding engine 82 transmits "In" and "Out" packets passed by the packet remarker 80 to the downstream domain 72.

Referring to FIG. 3, the operation of the packet remarker 80 is illustrated in further detail. The rate generator 78 feeds the packet remarker 80 tokens at a constant of r tokens or bits per second as is illustrated at 90 in FIG. 3. When a packet marked as "In" arrives from upstream domain 70, packet remarker 80 checks to see whether there are enough tokens for the packet. If enough tokens are available, the packet is forwarded as "In" and the tokens are deducted. If there are an insufficient number of tokens, the "In" packet is demoted to "Out" and forwarded to the downstream domain 72.

When the aggregate traffic of certain service levels exceeds the negotiated rate defined in the traffic profile, the packet is demoted to a lower service level. If the traffic rate of the service level is lower than the rate defined in the traffic profile, the lower service level packets are not promoted to a higher level because of problems associated with identifying which packets to promote.

For example, a first flow subscribes for certain throughput of assured services and a second flow subscribes for best effort services. Both packets pass through several domains. Some of the "In" packets of the first flow are demoted while crossing one of the domains if the traffic controller of a downstream domain has extra "In" tokens available, and if promotions are allowed at the downstream domain, both the best effort traffic and the demoted assured services traffic compete for promotion. The demoted assured services packets of the first flow should be promoted first. Because there is no way to identify demoted assured services packets, selective promotion cannot occur. Randomly promoting packets from both flows does not increase the likelihood that assured services of the first flow will occur.

In the network system according to the invention, packets that were originally marked as "In" and were subsequently marked as "Out" packets at nodes where the aggregate incoming traffic rate exceeded the available band-width are subsequently remarked as "In" packets when the bandwidth at a subsequent node is sufficient. According to the invention, the demoted "In" packets are identifiable from "Out" packets that were originally "Out". In addition, the networking system according to the invention ensures that promotion of the packets is fair relative to the respective flow traffic rate. The fairness is achieved by randomly making marking decisions on the packets. The traffic controller, according to the present invention, employs the AFPHB specified packet markings.

To support this functionality, a three-color marking process is employed with the colors red, yellow, and green. Yellow is used as an indicator for temporary demotion. The marking scheme of the traffic controller, according to the invention, is fair in demoting and promoting packets and provides improved performance for the in-profile traffic as compared to conventional schemes discussed above.

For a more complete understanding of the invention, its objects and advantages, reference may be had to the following specifications and to the accompanying drawings.

BRIEF DESCRIPTION OF THE DRAWINGS

FIG. 4 is a state diagram illustrating marking for a traffic conditioner according to the invention;

FIG. 5 is a functional block diagram illustrating a traffic conditioning marker according to the invention;

FIG. 6 further illustrates the operation of the traffic conditioning marker of FIG. 5;

DETAILED DESCRIPTION OF THE PREFERRED EMBODIMENT

Figure 1:
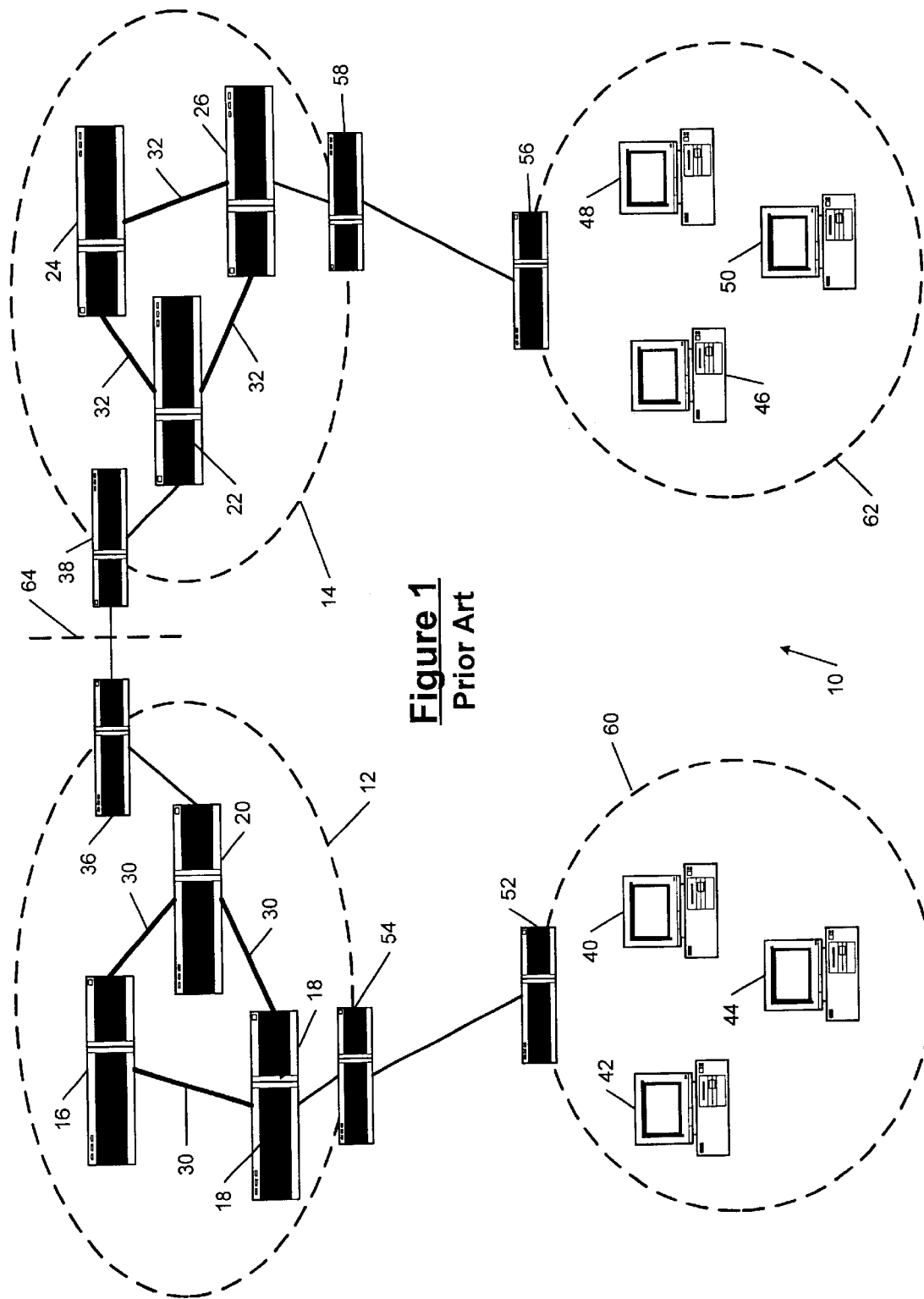
FIG. 1 illustrates an internet network system according to the prior art.

A random early demotion and promotion (REDP) marker for providing assured internet services provides promotion and demotion of packets and ensures that the demotion and promotion process is fair. By providing selective promotion of previously demoted packets, the performance of assured traffic is improved. The randomness of the packet marking decisions also ensures fairness as will be demonstrated in FIGS. 8–13.

Referring to FIG. 4, a tri-color marking model for the REDP marker according to the present invention is illustrated. Packets are marked as green 100, red 102, or yellow 104. Referring now to FIGS. 4 and 5, an upstream domain 110 and a downstream domain 114 are connected by a traffic conditioning marker 116 according to the invention. The traffic conditioning marker 116 includes a packet classifier 118 which segregates packets delivered from the upstream domain 110 into green, yellow, and red packets. The traffic conditioning marker 116 further includes a rate generator 120 which provides tokens at r bits per second to a packet remarking device 122.

The red packets output by packet classifier 118 are forwarded without remarking to a forwarding engine 124 and a downstream domain 114. The green and yellow packets, in turn, are forwarded by the packet classifier 118 to the packet remarking device 122. The packet remarking device 122 preferably includes a token collector 125 that receives tokens from the rate generator 120. A threshold level indicator 126 determines the state of the packet remarking device 122 based on a number n of tokens in the token collector 125. A remarker 127 remarks the priority level of data packets based on the state determined by the threshold level indicator 126. A token assignor 128 assigns one or more tokens from the token collector 125 to data packets having the first priority based on a size of the data packet.

Referring back to FIG. 4, while crossing a boundary between the upstream domain 110 and the downstream domain 114, a green packet is demoted to yellow if the packet rate of the green packets exceeds the negotiated rate between the upstream domain 110 and the downstream domain 114 at the traffic conditioning marker 116. A yellow packet is promoted to green if the packet rate of the green packets is lower than the negotiated rate. The yellow packet is never demoted to red and a red packet is never promoted to yellow or green. In other words, yellow is specifically used to mark demoted green packets. When the packet rate of the green packets is less than the negotiated rate, only yellow packets are promoted.

Referring now to FIG. 6, the operation of the traffic conditioning marker 116 is illustrated in further detail. The packet remarking device 122 has a token count that is initially set within a balanced region 132. The packet remarking device 122 further includes a promotion region 134 which lies above a high threshold 136 and below a maximum token quantity N 138. A demotion region 140 lies between zero tokens 142 and a low threshold 144. Tokens are input to packet remarking device 122 at a rate of r bits per second which is the negotiated rate for green packets between the upstream domain 110 and the downstream domain 114.

If the arriving rate of the green packets from the upstream domain 110 is equal to the token filling rate r, the token consumption rate of the packets flowing between upstream domain 110 and downstream 114 is the same as the token filling rate from rate generator 120. Therefore, the number of tokens in the packet remarking device 122 remains in the balanced region 132. Each of the packets is forwarded without changing the color of the packet.

If the arriving rate of the green packets exceeds r, the token consumption rate of the green packets from the upstream 110 to the downstream domain 114 exceeds the token filling rate of the rate generator 120. As a result, the number of tokens in the packet remarking device 122 decreases. Eventually, the level of tokens in the packet remarking device 122 falls into the demotion region 140. While in the demotion region 140, the packet remarking device 122 randomly demotes green packets to yellow with a probability of demotion $P_{demo}$ that is a function of the token count in the packet remarking device 122. A simple linear function for demotion is:

$$P_{demo} = (T_L - TK_{num}) \text{MAX}_{demo}/T_L$$

Where $\text{MAX}_{demo}$ is the maximum demotion rate, $TK_{num}$ is the current token count and $T_L$ is the lower threshold defining an upper limit of the demotion region 140. If this simple linear function is employed, when the token count equals zero, each arriving green packet is demoted to yellow. As can be appreciated, other demotion functions can be employed.

If the arriving rate of the green packets is less than r, the token filling rate of rate generator 120 exceeds the token consumption rate of the green packets flowing between upstream domain 110 and downstream domain 114. As a result, the number of tokens increases and the level of tokens in the packet remarking device 122 reaches the promotion region 134.

In the promotion region 134, each arriving green packet will still be forwarded as a green packet and consume a corresponding number of tokens. Each arriving yellow packet will be randomly promoted to a green packet with a probability of promotion $P_{promo}$ that is a function of the token count in the packet remarking device 122.

A simple linear function for promotion is:

$$P_{promo} = (TK_{num} - T_H) \text{MAX}_{promo}/(b - T_H)$$

Where $\text{MAX}_{promo}$ is the maximum promotion rate, $TK_{num}$ is the token count in the packet remarking device 122, b is the maximum token count, and $T_H$ is the high threshold 136. Skilled artisans will appreciate that other suitable promotion and demotion functions can be employed without departing from the spirit of the invention.

The traffic conditioning marker 116 according to the invention removes the phase effects of periodic flows by detecting the arriving rate of green packets early and by promoting or demoting packets randomly. During demotion, the traffic conditioning marker 116 keeps the number of demoted packets of each flow approximately proportional to the number of green packets of that flow. Similarly, during promotion the traffic conditioning marker 116 keeps the number of promoted packets of each flow approximately proportional to the number of yellow packets of that flow.

Figure 7:
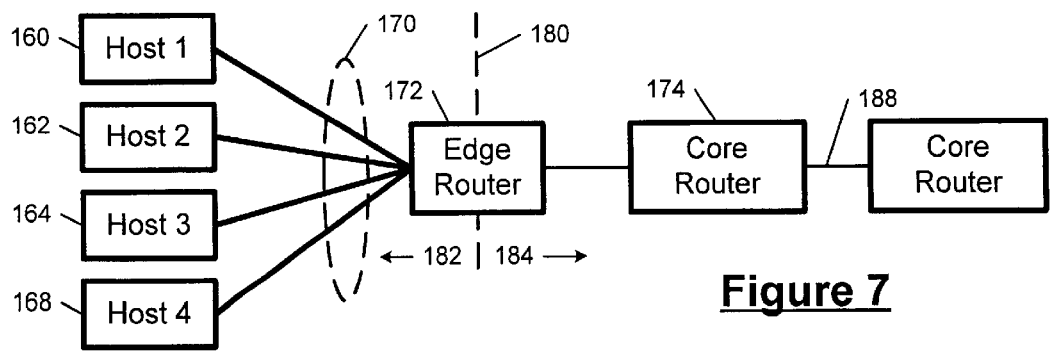
FIG. 7 is a functional block diagram illustrating a first example for demonstrating the operation of the networking system as it compares to conventional packet marking.

FIG. 7 depicts a network system for demonstrating the fairness of demotion. Hosts 160, 162, 164, and 168 each include a conventional leaf marker which is not shown. The leaf markers initially mark the packets. Each of the hosts 160, 162, 164, and 168 has a 0.5 Mbps assured service profile. Initially, each host can have up to 0.5 Mbps packets marked as green. The remaining packets are marked as red. Each flow originates from a host and passes through one or more domains 170, edge router 172, one or more core routers 174, and terminates at core router 178. After successfully crossing one or several domains 170, the packets reach the edge router 172 which is at a boundary 180 between first and second domains 182 and 184. If the first domain 182 has not negotiated enough token rate with the second domain 184, then some of the green packets need to be demoted to yellow.

Figure 2:
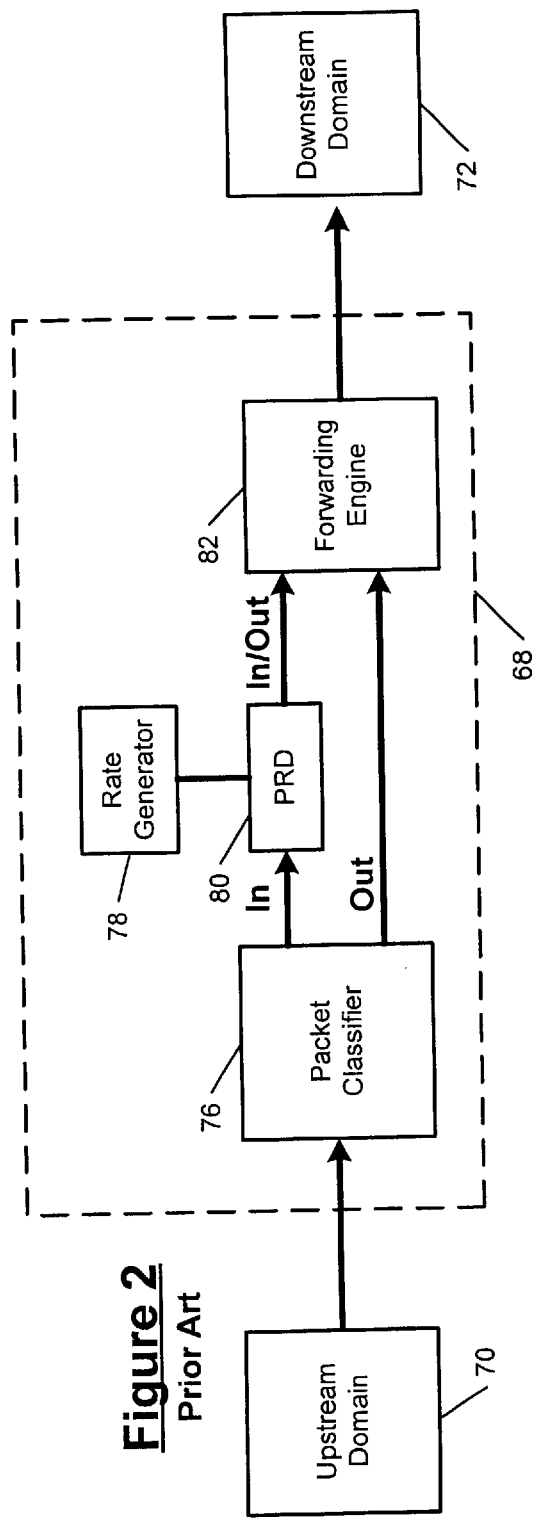
FIG. 2 is a block diagram illustrating a traffic conditioning marker according to the prior art.
Figure 3:
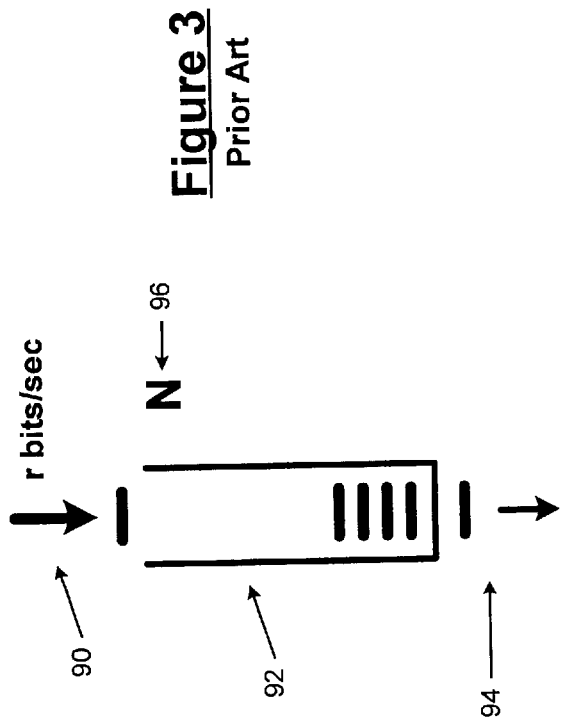
FIG. 3 illustrates the operation of the traffic conditioning marker of FIG. 2.
Figure 8:
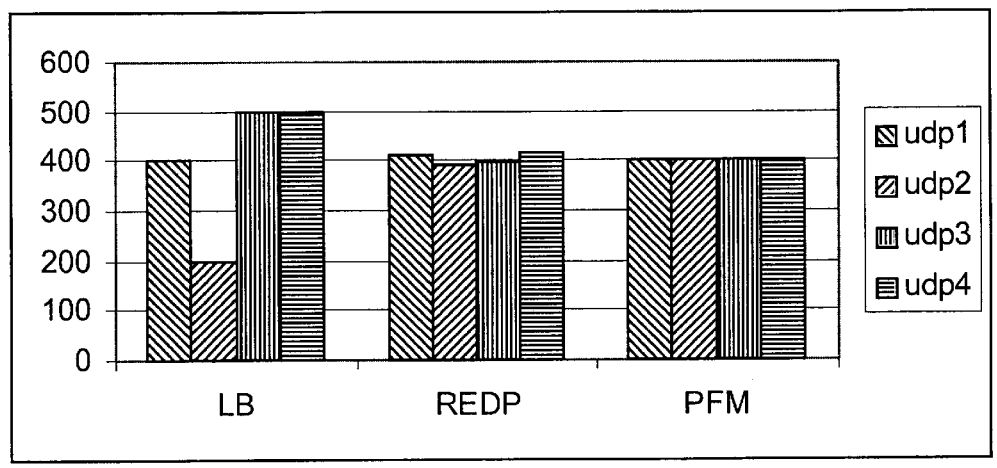
FIG. 8 is a chart illustrating demotion fairness for various UDP sources and with all four data flows having the same sending rate.
Figure 9:
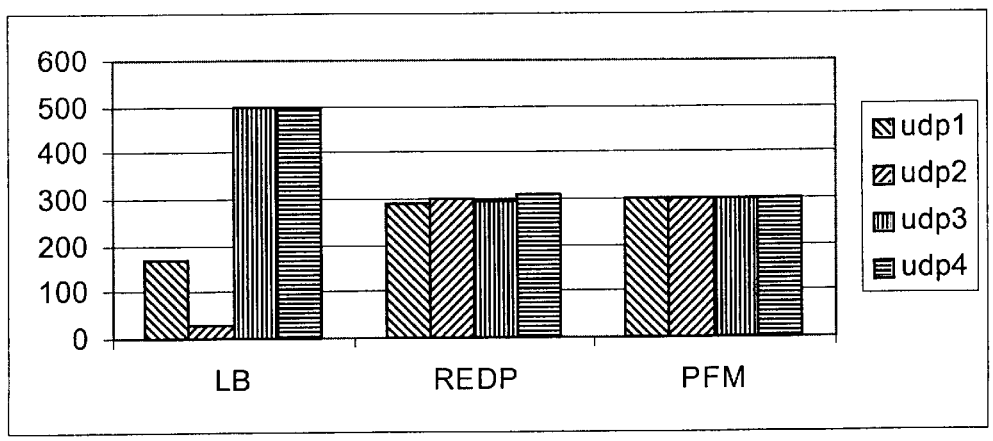
FIG. 9 illustrates the various UDP sources of FIG. 8 with a lower rate bottleneck link between core routers.

Referring to FIGS. 8 and 9, the performance of alternative marking schemes is illustrated. "LB" refers to the leaky bucket scheme illustrated in FIGS. 2 and 3. REDP refers to random early demotion and promotion performed by the traffic conditioning marker according to the invention. PFM refers to per flow marking which is implemented in the following way: All of the intermediate markers are assumed to know the original submitted rate of each flow. Tokens that are assigned to each flow are proportional to the original submitted rate. This model, although being the fairest of the three, requires per flow monitoring and signaling. This model is not practical as an intermediate marker because of scalability problems. PFM would also require substantial modification to the internet infrastructure. PFM is used here only to show an ideal case and to evaluate the fairness of the REDP marker.

The token filling rate of both the REDP and LB is x Mbps where x is less than 2 Mbps. After being remarked by a traffic conditioning marker located in the edge router 172, the packet is forwarded to the core router 174 and terminates at the core router 178. The link capacity between the edge router 172 and the core router 174 is larger than the aggregate bandwidth of the four packet flows from the hosts 160, 162, 164, and 168. A link capacity 188 between core router 174 and core router 178 is exactly x Mbps. Assured services is preferably implemented in the core router 174 through the RIO scheme. In the core routers 174 and 178, all of the green packets are treated as "In" and both red and yellow packets are treated at "Out". This configuration ensures that the aggregate green packets from the core router 174 to the core router 178 is exactly the link capacity. In other words, all of the green packets would be forwarded and almost all of the yellow and red packets would be dropped. By computing the throughput of each flow at the core router 178, the fairness of the demotion for the different intermediate markers can be derived. Theoretically, if the demotion is fair, each flow should get approximately the same throughput, or x Mbs divided by 4.

Referring now to FIG. 8, four UDP sources, UDP1, UDP2, UDP3, and UDP4 are initiated by the hosts 160, 162, 164, and 168, respectively. The sending rate of each flow is 0.6 Mbps. Originally, 0.5 Mbps is marked as green packets and the remaining 0.1 Mbps is marked as red packets. The token filling rate of the intermediate marker x equals 1.6 Mbps. At the edge router 172, 2.0 Mbps green packets arrive, but only 1.6 Mbps of the packets can be marked as green before entering the downstream domain 184. If the intermediate marker implemented in the edge router 172 is ideally fair, each flow should have 0.4 Mbps green packets and 0.1 Mbps packets demoted to yellow. Because the bandwidth of a bottleneck link 188 is exactly 1.6 Mbps, only the green packets can pass this link. All of the yellow and red packets will be dropped here.

FIG. 8 illustrates the throughput in kbps for the three different markers. If the leaky bucket marker is employed, the throughput of the four flows is highly biased. The flow UDP2 receives only 200 kbps while the flows UDP3 and UDP4 receive about 500 kbps each. This disparity is a result of synchronization problems. The four UDP flow from hosts 160, 162, 164, and 168 have the same rate and sending characteristics. In this particular example, when a green packet of the flow UDP2 is sent, the leaky bucket of the conventional system just happens to have run out of tokens. This demonstrates the non-random and unfair demotion occurring with conventional traffic conditioning markers. As can be appreciated from FIG. 8, the REDP marker approaches the ideal case shown for the PFM marker (or 400 kbps) without the scalability and costs associated therewith.

In FIG. 6, a different demotion ratio is employed. Here, the token filling rate x equals 1.2 Mbps. Ideally, 300 kbps of each flow should be passed on as green and 200 kbps should be demoted as yellow. As can be appreciated from FIG. 9, the leaky bucket approach according to the prior art shows a highly biased throughput. The REDP traffic conditioning marker removes synchronization or phase effects and is very fair as demonstrated by comparing the results of the REDP flows with the ideal PFM marker.

Figure 10:
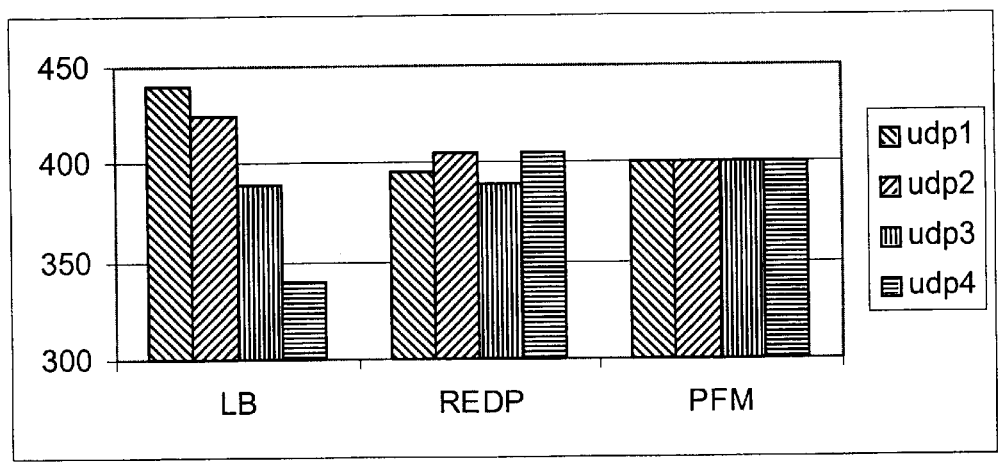
FIG. 10 is a chart illustrating demotion fairness for various UDP sources and with the data flows having different sending rates.
Figure 11:
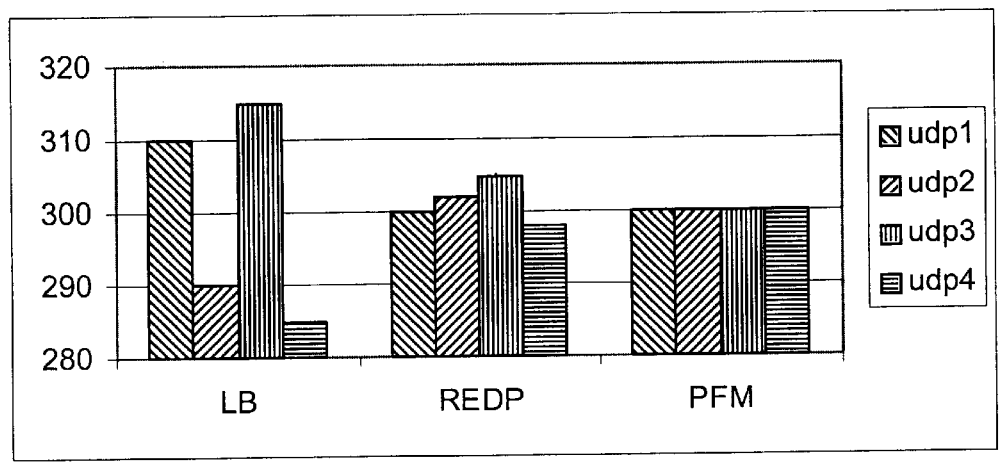
FIG. 11 is a chart illustrating demotion fairness for the various UDP sources of FIG. 10 with a reduced negotiated rate.

Referring now to FIG. 10, the sending rate is changed and the simulation is repeated. The sending rate of host UDP1 is 0.79 Mbps. Hosts 162, 164, and 168 have sending rates of 0.73 Mbps, 0.53 Mbps, and 0.61 Mbps respectively. Note that 0.5 Mbps of each flow are marked as green and the remaining packets are marked red. The token filling rate x equals 1.6 Mbps and in FIG. 11, the token filling rate x equals 1.2 Mbps. FIGS. 10 and 11 demonstrate that the leaky bucket still has a biased throughput. The REDP traffic conditioning marker according to the present invention achieves improved fairness over the leaky bucket marker. The fairness of the REDP traffic conditioning marker approaches the ideal PFM marker. As can be appreciated, the REDP traffic conditioning marker has performance similar to the ideal PFM case without the scalability and cost problems of PFM.

Phase effects are very common for UDP sources. Depending on the rate of each flow, the negotiated rate, and the packet size, the phase effects vary significantly. By using REDP markers according to the present invention, a random component is incorporated into the path of the packets. The randomness removes the deterministic phase effects such that the REDP marker performs fair demotion and promotion.

Transmission control protocol (TCP) sources have phase effects because of a sliding window flow control algorithm. A TCP source will not send a subsequent burst of packets until the TCP source receives the acknowledgment (ACK) of a current burst of packets. The period of the TCP packets is the round trip time (RTT) of the connection. Packet flows with a similar RTT often experience biased throughputs if a common link is shared.

Figure 12:
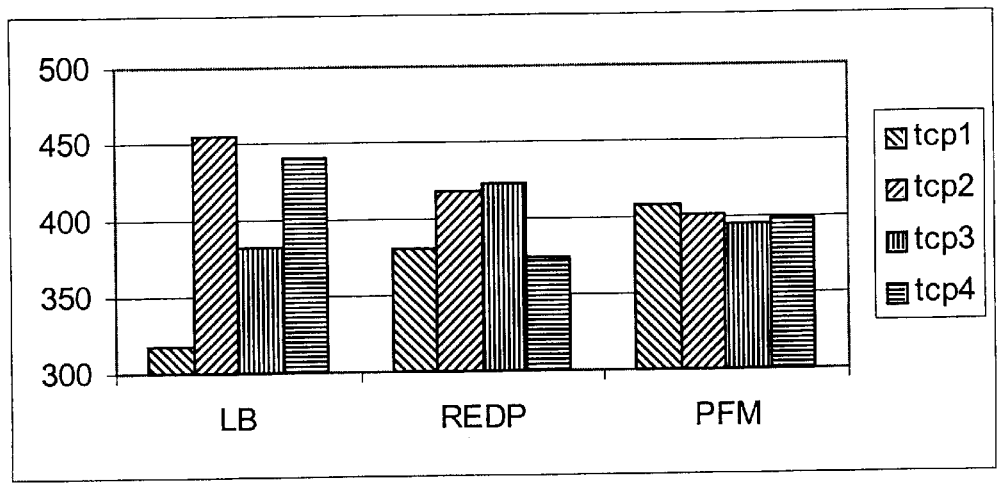
FIG. 12 is a chart illustrating demotion fairness for various TCP sources.
Figure 13:
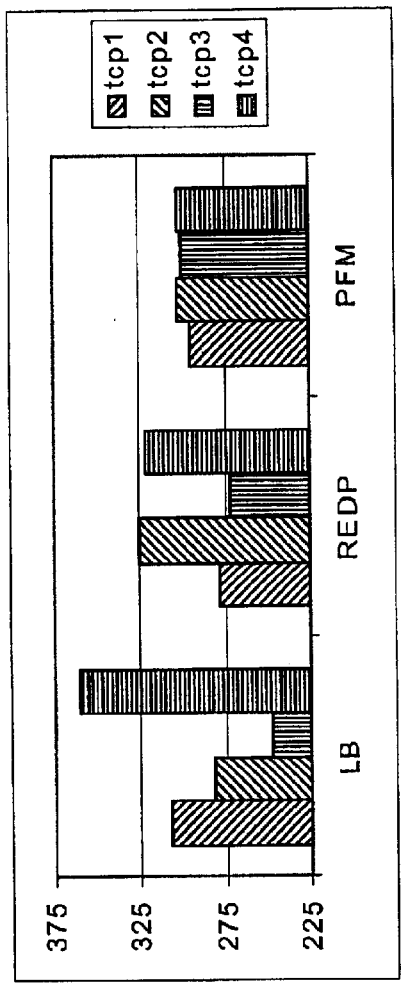
FIG. 13 is a chart illustrating demotion fairness for the various TCP sources at a lower negotiated rate.

Referring now to FIGS. 12 and 13, four TCP sources are substituted for the four UDP sources in FIGS. 8–11. The network system of FIG. 7 is employed. The delay of the link between host 160 and the edge router 172 is 1 millisecond (ms). The delay of the link between host 164 and the edge router 172 is 1 ms. The delay of the link between core router 174 and core router 178 is 10 ms. Therefore, the RTT of each flow is 26 ms, 28 ms, 26 ms, and 28 ms, respectively.

A throughput of each flow is shown in FIGS. 12 and 13. In FIG. 12, the token filling rate x equals 1.6 Mbps. In FIG. 13, the token filling rate x equals 1.2 Mbps. The phase effect can be observed when the leaky bucket marker is employed. The ideal PFM marker and the REDP markers increase the fairness of demotion. While still providing an improvement over the LB marker, the fairness improvement of the REDP marker is not as pronounced using TCP sources because TCP has its own flow control and congestion algorithms.

Depending upon network traffic, a packet that was demoted at a boundary of a domain may or may not get dropped in that domain. If the packet is not dropped, it is preferable to promote the packet as soon as excess tokens exist in any of the downstream traffic conditioning markers in the edge routers. This method ensures that a packet does not get dropped under minor transient congestion.

Figure 14:
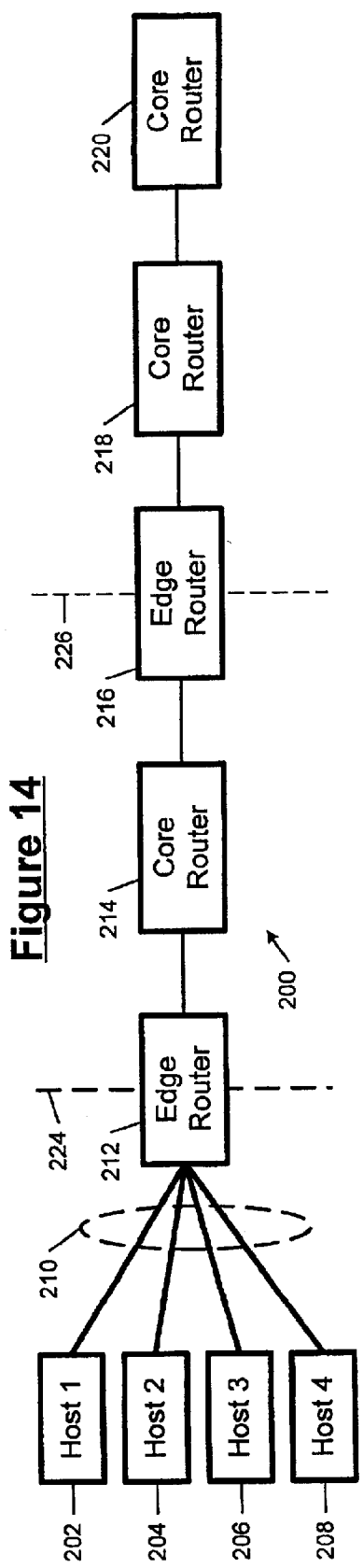
FIG. 14 is a function block diagram illustrating a second example networking system for demonstrating the operation of the invention as it compares to conventional packet marking.

Referring now to FIG. 14, a network system 200 will be employed to demonstrate the benefits of promotion. Hosts 202, 204, 206, and 208 are connected via one or more domains 210 to an edge router 212. Edge router 212 is connected to core router 214 which is connected to an edge router 216. Core routers 218 and 220 are connected to the edge router 216. The edge routers 212 and 216 each have a traffic conditioning marker implemented therein. The core routers 214, 218, and 220 have built-in RIO mechanisms for flow control. The hosts 202, 204, 206, and 208 each have a flow initiated therein which is routed through successive edge routers 212 and core routers 214, 216, 218, 220. Each flow crosses a first domain at 224 and a second domain at 226. At a first domain boundary defined by the edge router 212, there is not enough negotiated rate to forward all of the green packets. Some of the green packets must be demoted. At the second domain boundary 226 located at edge router 216, there is an excess of negotiated rate.

If no promotion is allowed, only two colors are needed—green and red (or "In" and "Out"). When there is a deficiency in the negotiated rate, green packets are demoted to red. When an excess of negotiated rate is available, red packets are not promoted to green.

If a two-color promotion scheme is employed, only two colors are needed. When excess negotiated rate is available, red packets are promoted to green. In the case of deficient negotiated rate, green packets are demoted to red. In the two-color promotion case, there is no distinction between a packet that is originally marked as red and a demoted green packet that is currently marked as red. Therefore, selective promotion of previously green packets is not possible.

If a three-color promotion scheme is employed, three colors are employed. When excess negotiated rate is available, yellow packets are promoted to green. In the case of deficient negotiated rate, green packets are demoted to yellow. No demotion or promotion is performed between yellow and red. In the core routers, green packets are treated as "In" and both yellow and red packets are treated as "Out".

In this example, assume that hosts 202 and 206 each negotiate 500 kbps assured services and hosts 204 and 208 negotiate for best-effort services. Four UDP flows (UDP1, UDP2, UDP3, and UDP4) start from hosts 202, 204, 206, and 208, respectively, and are ultimately received by core router 220. The rate of each flow is set at 500 kbps. UDP1 and UDP3 each have 500 kbps packets marked as green. UDP2 and UDP4 each have 500 kbps packets marked as red. At edge router 212, up to 600 kbps green packets are allowed to be forwarded to the next domain. Approximately 40% of the green packets are demoted at edge router 212.

Figure 15:
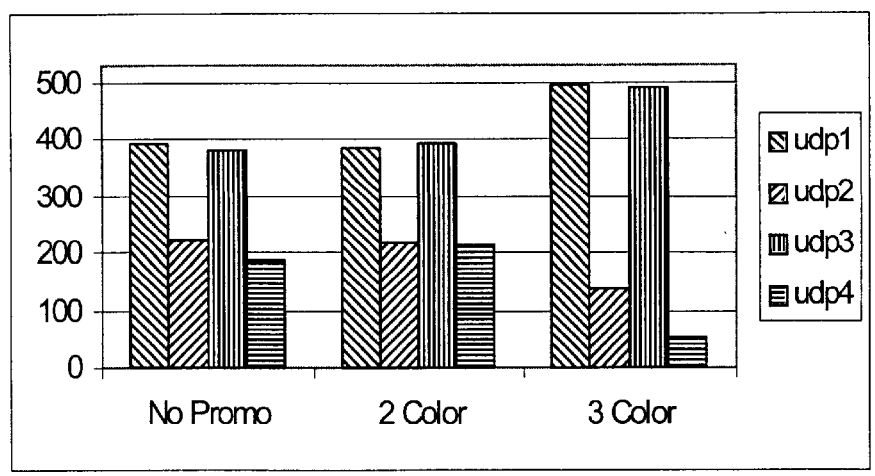
FIG. 15 is a chart illustrating promotion fairness for no promotion, two-color promotion and three-color promotion marking for UDP sources.

In FIG. 15, the token filling rate x equals 2 Mbps. Therefore, no congestion happens in this domain and the demoted packets are not dropped. At edge router 216, x equals 1.2 Mbps. Therefore, up to 1.2 Mbps green packets are allowed to be forwarded to the next domain. If promotion is allowed, some of the yellow or red packets can be promoted to green. As can be appreciated, link between core router 218 and 220 is the bottleneck link.

Without promotion, a demoted packet is treated as "Out" for all the remaining domains. Some of the packets will be dropped at the bottleneck link. For UDP1 and UDP3, about 400 kbps throughput is achieved although 500 kbps was submitted. If the two-color promotion scheme is employed, some of the red packets can be promoted at edge router 216. However, since the packets which were demoted to red are not identifiable, both types of packets can be promoted to green which does not improve the throughput assurance of flows UDP1 and UDP3 (as demonstrated in the comparison between no promotion and two-color promotion in FIG. 15). If three-color promotion is employed, yellow is used to identify demoted green packets. In the edge router 216, only the yellow packets are promoted to green. The bandwidth assurance of UDP1 and UDP2 is improved, and each obtain approximately 500 kbps throughput as illustrated in FIG. 15.

Figure 16:
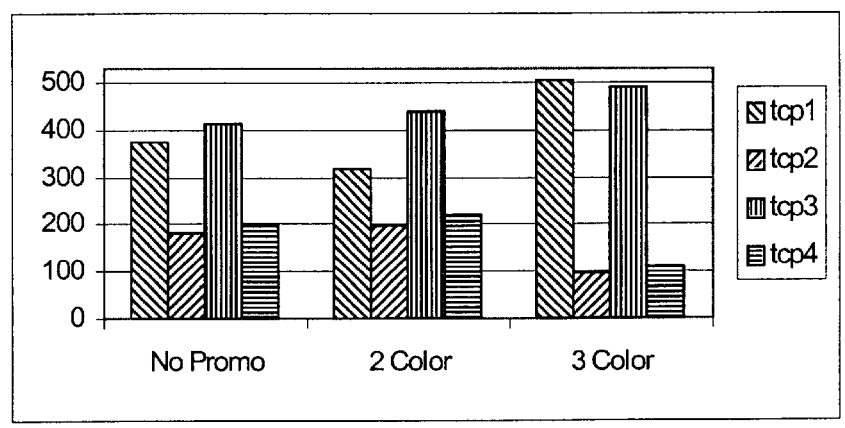
FIG. 16 is a chart illustrating no promotion, two-color promotion and three-color promotion marking for TCP sources.

FIG. 16 employs similar parameters as those employed with respect to FIGS. 14 and 15, however, four TCP sources have been substituted. As can be appreciated, similar improvements as those illustrated in FIG. 15 are obtained using three-color promotion. No promotion and two-color promotion have similar performances. Therefore, three-color promotion according to the Invention benefits both TCP and UDP traffic.

In the simulation illustrated in FIGS. 14–16 and described above, the token filling rate (x equals 2 Mbps) was set to prevent congestion in the first domain. The same throughput assurances for the UDP1 and UDP3 flows would not occur if the token filling rate was selected to be 1.2 Mbps. Since only two drop preferences are supported for routers 214, 218, and 220, the yellow packets are treated the same as red packets in the core router. If congestion happens in the first domain, some of the yellow packets will be dropped before they reach the edge router 216. Promotion will not help to improve the throughput assurances of UDP1 and UDP3. If, however, the core router supports three drop preferences, yellow packets can be protected during network congestion. In other words, a lower drop probability should be assigned to the yellow packets as compared to the red packets so that the yellow packets will be protected during network congestion. Green would have the lowest drop probability and red would have the highest.

Figure 17:
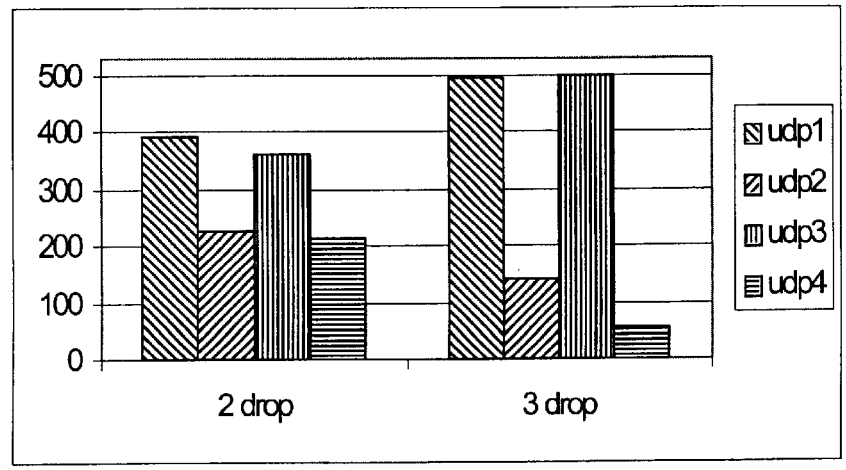
FIG. 17 is a chart illustrating the promotion fairness for two-drop and three-drop preferences with UDP sources.
Figure 18:
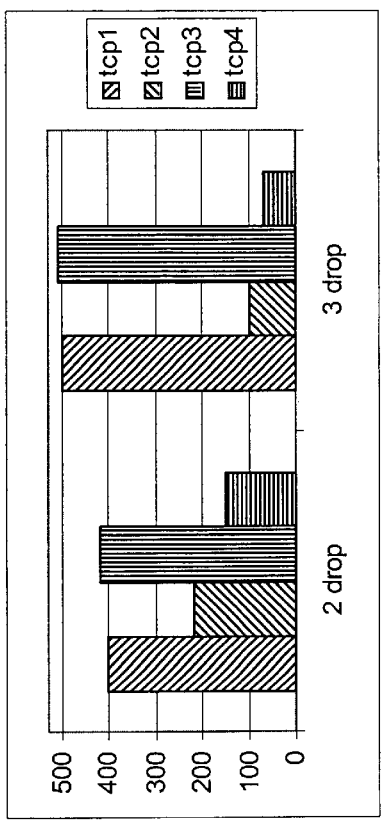
FIG. 18 illustrates the promotion fairness for two-drop and three-drop preferences for TCP sources.

FIGS. 17 and 18 illustrate the throughput by adding one or more drop preferences to the core routers 214, 218, and 220. FIG. 17 relates to UDP sources and FIG. 18 relates to TCP sources. The token filling rate of edge routers 212 and 216 are set to 1.2 Mbps. As can be appreciated, the throughput of a three-drop preference marker coupled with core routers having three-drop probabilities greatly improves the throughput assurance of the flows UDP1 and UDP3 and each obtain a throughput of 500 kbps. Similar results occur for TCP sources as demonstrated in FIG. 18.

For the LB marker, the only variable parameter is the maximum burst rate N. The REDP traffic conditioning marker according to the invention employs additional parameters that determine the demotion and promotion process.

$T_L$ and $MAX_{demo}$ are two parameters which determine the fairness of the demotion process. If $T_L$ equals zero, the demotion is the same as the demotion of a leaky bucket marker. In order to ensure enough randomness for the demotion process, $T_L$ needs to be large enough. However, increasing $T_L$ may result in a larger maximum burst size N. Therefore, $T_L$ should be set to ensure both sufficient fairness and an acceptable burst size.

The range of $MAX_{demo}$ is between zero and one. If $MAX_{damo}$ equals zero, a green packet will not get demoted until the bucket runs out of tokens. Therefore, the demotion process is the same as the demotion in the case of the leaky bucket marker. Given the fact that $T_L$ cannot be set to be very large, selecting a large enough $MAX_{demo}$ could improve the utilization of the demotion region thereby improving the randomness of the demotion.

Figure 19:
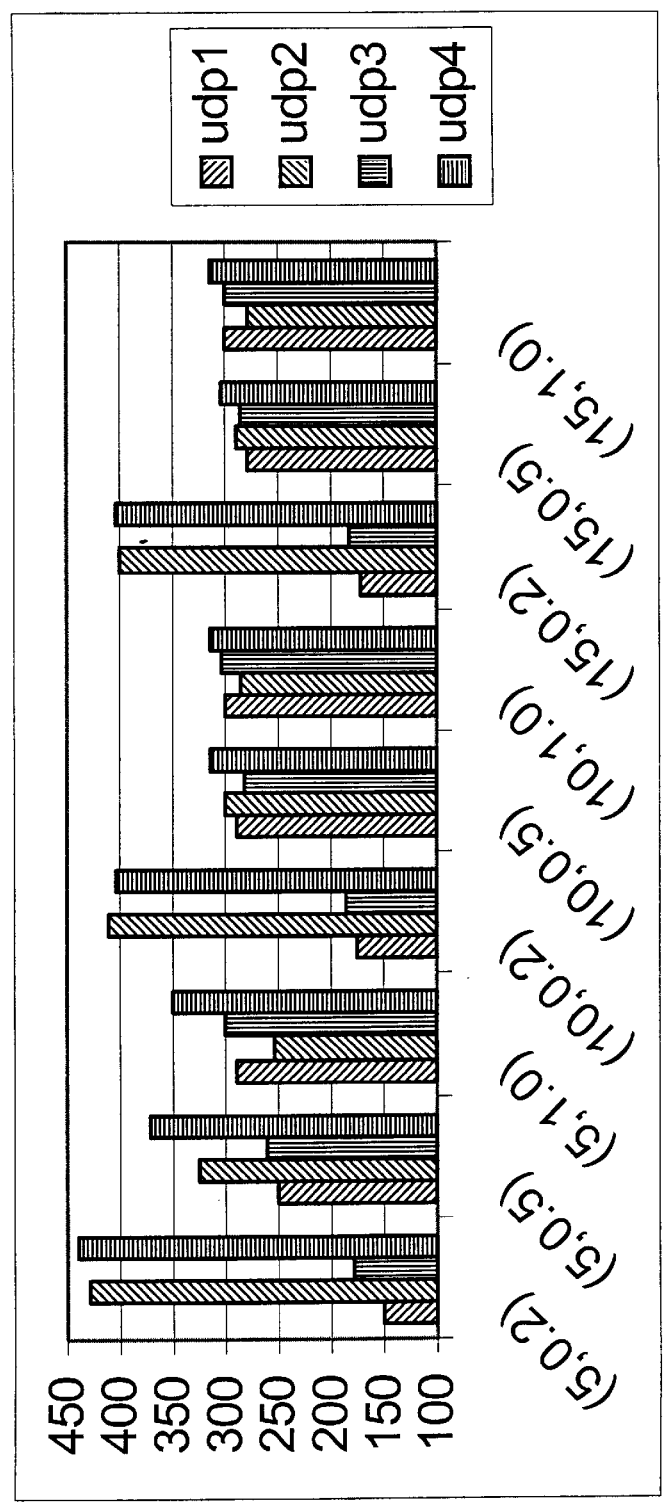
FIG. 19 is a chart that illustrates the sensitivity of throughput to changes in the drop threshold and maximum demotion rate.

In FIG. 19, the fairness of demotion using different $T_L$ and $MAX_{demo}$ selections on the network system of FIG. 7 is illustrated. The overall demotion rate is set to 40%. Each UDP flow should have 200 kbps green packets demoted and 300 kbps forwarded in an ideal case. It can be observed that when $MAX_{demo}$ equals 0.5, the demotion fairness increases with the increase in $T_L$. The results are unfair for all values of $T_L$ when $MAX_{demo}$ equals 0.2. Therefore, it appears that the degree of fairness increases with the increase in $MAX_{demo}$. The fairness also improves with the increase in $T_L$. For low values of $MAX_{demo,}$ the results are unfair irrespective of the variations in $T_L$. Based on these observations, $MAX_{demo}$ and $T_L$ are preferably set reasonably high. Also, preferably the process of promotion is symmetrical to that of demotion. Therefore, $B-T_H=T_L$ and $MAX_{promo}=MAX_{demo}$.

$T_H-T_L$ determines the size of the balanced region which should also be selected to be large enough. If the balance region is too small, the leaky bucket may oscillate between the demotion region and the promotion region. This may cause unnecessary demotion and promotion. While large $(T_H-T_L)$ may increase the bucket size N and the maximum burst size, it will also delay the demotion and promotion processes. Preferably, $T_H-T_L=10$ is a desirable balanced region.

From the foregoing it will be understood that the invention provides a traffic conditioning marker that provides assured services for the internet through promotion and demotion of packets in a fair and random manner. The traffic conditioning marker according to the invention removes the phase effects of periodic flows by detecting the rising rate of green packets early and by promoting or demoting packets randomly. During demotion, the traffic conditioning marker keeps the number of demoted packets of each flow approximately proportional to the number of green packets of that flow. During promotion, the traffic conditioning marker keeps the number of promoted packets of each flow approximately proportional to the number of yellow packets of that flow.

While the invention has been described in its presently preferred embodiments, it will be understood that the invention is capable of certain modification and change without departing from the spirit of the invention as set forth in the appended claims.

What is claimed is:

1. A traffic conditioner for a network system that routes a plurality of data packets, each having one of a first, a second and a third priority level, from an upstream domain to a downstream domain, comprising:
   a rate generator that generates tokens at a token rate;
   a token receiver connected to said token generator that contains n tokens where n is between 0 and N;
   a token level indicator connected to said token receiver and having a plurality of states based upon the number of tokens n in said token receiver, wherein at least one of said states is a promotion state; and
   a data packet remarker, connected to said token level indicator, that promotes at least one of said data packets having said second priority level to said first priority level when said token level indicator is in said promotion state,
   wherein said second priority level is used exclusively for said data packets that previously had said first priority level and were demoted.

2. The traffic controller of claim 1 further comprising:
   a token assignor, connected to said data packet remarker, that removes said tokens from said token receiver, assigns said tokens to said data packets having said first priority and forwards said data packets to said downstream domain.

3. The packet remarker of claim 2 wherein a number of tokens that said token assignor assigns to said data packets having said first priority is based upon a size of said data packets.

4. The traffic controller of claim 2 wherein said token level indicator is in said promotion state when said number of tokens n in said token receiver is between an upper threshold $T_H$ and N.

5. The traffic controller of claim 4 wherein said token level indicator further includes a balanced state and wherein said token level indicator is in said balanced state when said number of tokens n is between a lower threshold $T_L$ and said upper threshold $T_H$.

6. The traffic controller of claim 5 wherein said token level indicator includes a demotion state and wherein said token level indicator is in said demotion state when said number of tokens n is between 0 and said lower threshold $T_L$.

7. The traffic controller of claim 6 wherein said data packet remarker demotes said data packets having said first priority level to said second priority level when said token level indicator is in said demotion state.

8. A distributed network system that delivers a data stream including a plurality of data packets each having one of a first, a second and a third priority level, comprising:
   an upstream domain;
   a downstream domain; and
   a router that connects said upstream domain and said downstream domain and includes a packet remarker that has a promotion state, a demotion state and a balanced state, that promotes at least one of said data packets having said second priority level to said first priority level when said packet remarker is in said promotion state and that demotes at least one of said data packets having said first state to said second state when said packet remarker is in said demotion state;
   wherein said second priority level is used exclusively for said data packets that previously had said first priority level and were demoted.

9. The distributed network system of claim 8 wherein said router includes:
   a rate generator that generates tokens at a token rate;
   a token receiver that contains a number of tokens n from said rate generator, where n is between 0 to N; and
   a token level indicator connected to said token receiver which determines whether said packet remarker is in said promotion state, said demotion state or said balanced state based on said number of tokens n in said token receiver.

10. The distributed network system of claim 9 wherein said packet remarker further includes:
    a token assignor, connected to said token receiver, that removes said tokens from said token receiver and assigns said tokens to said data packets having said first priority.

11. The distributed network system of claim 10 wherein said packet remarker takes on said demotion state when said number of tokens n lies between 0 and a low threshold $T_L$.

12. The distributed network system of claim 11 wherein said packet remarker takes on said promotion state when said number of tokens n lies between a high threshold $T_H$ and N.

13. The distributed network system of claim 12 wherein said packet remarker takes on said balanced state when said number of tokens n lies between said low threshold $T_L$ and said high threshold $T_H$.

14. The distributed network system of claim 12 wherein said packet remarker has a maximum promotion rate $Max_{promo}$ and promotes said data packets based on a promotion probability:

$$P_{promo}=(n-T_H)*Max_{demo}/T_H.$$

15. The distributed network system of claim 11 wherein said packet remarker has a maximum demotion rate $Max_{demo}$ and demotes said data packets based on a demotion probability:

$$P_{demo}=(T_L-n)*Max_{demo}/T_L.$$

16. A distributed network system that delivers a data stream including a plurality of data packets each having one of a first, a second and a third priority level, comprising:
an upstream domain;
a downstream domain; and
a router that connects said upstream domain and said downstream domain and includes a packet remarker that randomly and fairly promotes said data packets having said second priority level to said first priority level and that randomly and fairly demotes said data packets having said first priority level to said second priority level,
wherein said second priority level is used exclusively for said data packets that previously had said first priority level and were demoted.

17. The distributed network system of claim 16 wherein said packet remarker has a promotion state, a demotion state and a balanced state and includes:
a rate generator that generates tokens at a token rate;
a token receiver that contains a number of said tokens n received from said rate generator, where n is between 0 to N; and
a token level indicator connected to said token receiver which determines whether said packet remarker is in said promotion state, said demotion state or said balanced state based on said number of said tokens n in said token receiver.

18. The distributed network system of claim 17 wherein said packet remarker takes on said demotion state when said number of tokens n lies between 0 and n and a low threshold $T_L$, takes on said promotion state when said number of tokens n lies between a high threshold $T_H$ and N and takes on said balanced state when said number of tokens n lies between said low threshold $T_L$ and said high threshold $T_H$.

19. The distributed network system of claim 18 wherein when said packet remarker is in said demotion state, said packet remarker has a maximum demotion rate $Max_{demo}$ and demotes said data packets based on a demotion probability:

$$P_{demo}=(T_L-n)*Max_{demo}/T_L.$$

20. The distributed network system of claim 18 wherein said packet remarker has a maximum promotion rate $Max_{promo}$ and promotes said data packets based on a promotion probability:

$$P_{promo}=(n-T_H)*Max_{demo}/T_H.$$

21. A distributed network system that delivers a data stream including a plurality of data packets each having one of a first, a second and a third priority level, comprising:
an upstream domain;
a downstream domain; and
a router that connects said upstream domain and said downstream domain and includes a packet remarker that has a promotion state, a demotion state and a balanced state, that promotes at least one of said data packets having said second priority level to said first priority level when said packet remarker is in said promotion state and that demotes at least one of said data packets having said first state to said second state when said packet remarker is in said demotion state,
wherein said second priority level is used for said data packets that previously had said first priority level and were demoted,
wherein said router includes:
(a) a rate generator that generates tokens at a token rate;
(b) a token receiver that contains a number of tokens n from said rate generator, where n is between 0 to N; and
(c) a token level indicator connected to said token receiver which determines whether said packet remarker is in said promotion state, said demotion state or said balanced state based on said number of tokens n in said token receiver;
wherein said packet remarker further includes a token assignor, connected to said token receiver, that removes said tokens from said token receiver and assigns said tokens to said data packets having said first priority;
wherein said packet remarker takes on said demotion state when said number of tokens n lies between 0 and a low threshold $T_L$, has a maximum demotion rate $Max_{demo}$ and demotes said data packets based on a demotion probability:

$$P_{demo}=(T_L-n)*Max_{demo}/T_L.$$

22. A distributed network system that delivers a data stream including a plurality of data packets each having one of a first, a second and a third priority level, comprising:
an upstream domain;
a downstream domain; and
a router that connects said upstream domain and said downstream domain and includes a packet remarker that has a promotion state, a demotion state and a balanced state, that promotes at least one of said data packets having said second priority level to said first priority level when said packet remarker is in said promotion state and that demotes at least one of said data packets having said first state to said second state when said packet remarker is in said demotion state,
wherein said second priority level is used for said data packets that previously had said first priority level and were demoted,
wherein said router includes:
(a) a rate generator that generates tokens at a token rate;
(b) a token receiver that contains a number of tokens n from said rate generator, where n is between 0 to N; and
(c) a token level indicator connected to said token receiver which determines whether said packet remarker is in said promotion state, said demotion state or said balanced state based on said number of tokens n in said token receiver;
wherein said packet remarker further includes a token assignor, connected to said token receiver, that removes said tokens from said token receiver and assigns said tokens to said data packets having said first priority;

wherein said packet remarker takes on said demotion state when said number of tokens n lies between 0 and a low threshold $T_L$, takes on said promotion state when said number of tokens n lies between a high threshold $T_H$ and N, has a maximum promotion rate $Max_{promo}$ and promotes said data packets based on a promotion probability:

$$P_{promo}=(n-T_H)*Max_{demo}/T_H.$$

23. A distributed network system that delivers a data stream including a plurality of data packets each having one of a first, a second and a third priority level, comprising:

an upstream domain;

a downstream domain; and a router that connects said upstream domain and said downstream domain and includes a packet remarker that randomly and fairly promotes said data packets having said second priority level to said first priority level and that randomly and fairly demotes said data packets having said first priority level to said second priority level, wherein said second priority level is used for said data packets that previously had said first priority level and were demoted, wherein said packet remarker has a promotion state, a demotion state and a balanced state and includes:
 (a) a rate generator that generates tokens at a token rate;
 (b) a token receiver that contains a number of said tokens n received from said rate generator, where n is between 0 to N; and
 (c) a token level indicator connected to said token receiver which determines whether said packet remarker is in said promotion state, said demotion state or said balanced state based on said number of said tokens n in said token receiver, wherein said packet remarker takes on said demotion state when said number of tokens n lies between 0 and n and a low threshold $T_L$, takes on said promotion state when said number of tokens n lies between a high threshold $T_H$ and N and takes on said balanced state when said number of tokens n lies between said low threshold $T_L$ and said high threshold $T_H$, and wherein said packet remarker has a maximum demotion rate $Max_{demo}$ and demotes said data packets based on a demotion probability:

$$P_{demo}=(T_L-n)*Max_{demo}/T_L.$$

24. A distributed network system that delivers a data stream including a plurality of data packets each having one of a first, a second and a third priority level, comprising:

an upstream domain;

a downstream domain; and a router that connects said upstream domain and said downstream domain and includes a packet remarker that randomly and fairly promotes said data packets having said second priority level to said first priority level and that randomly and fairly demotes said data packets having said first priority level to said second priority level, wherein said second priority level is used for said data packets that previously had said first priority level and were demoted, wherein said packet remarker has a promotion state, a demotion state and a balanced state and includes:
 (a) a rate generator that generates tokens at a token rate;
 (b) a token receiver that contains a number of said tokens n received from said rate generator, where n is between 0 to N; and
 (c) a token level indicator connected to said token receiver which determines whether said packet remarker is in said promotion state, said demotion state or said balanced state based on said number of said tokens n in said token receiver, wherein said packet remarker takes on said demotion state when said number of tokens n lies between 0 and n and a low threshold $T_L$, takes on said promotion state when said number of tokens n lies between a high threshold $T_H$ and N and takes on said balanced state when said number of tokens n lies between said low threshold $T_L$ and said high threshold $T_H$, and wherein said packet remarker has a maximum promotion rate $Max_{promo}$ and promotes said data packets based on a promotion probability:

$$P_{promo}=(n-T_H)*Max_{demo}/T_H.$$

* * * * *